United States Patent [19]
Krebs et al.

[11] Patent Number: 4,858,353
[45] Date of Patent: Aug. 22, 1989

[54] GROCERY SHOPPER ORGANIZER

[76] Inventors: Arthur D. Krebs, 835 So. 49th Ave.;
Martin C. Guenette, 1507 So. 50th
St., both of Omaha, Nebr. 68106

[21] Appl. No.: 115,201
[22] Filed: Nov. 2, 1987
[51] Int. Cl.⁴ ............................................. G09F 3/00
[52] U.S. Cl. .................................................. 40/308
[58] Field of Search ............... 40/308, 312, 617, 657,
40/658; 281/45; 211/50, 90

[56] References Cited

U.S. PATENT DOCUMENTS

| 2,888,761 | 6/1959 | Miller | 40/10 |
| 3,251,543 | 5/1966 | Bush et al. | 235/1 |
| 3,265,297 | 8/1966 | Behrens | 40/308 |
| 3,287,841 | 11/1966 | Spragg et al. | 40/308 |
| 3,539,204 | 11/1970 | Keller | 40/308 |
| 3,881,267 | 5/1975 | Hicks | 40/308 |
| 4,034,539 | 7/1977 | Economy | 40/308 |
| 4,292,749 | 10/1981 | Thomas | 40/308 |
| 4,423,888 | 1/1984 | Addison | 281/45 |
| 4,496,058 | 1/1985 | Harris et al. | 40/308 |

OTHER PUBLICATIONS

Elks Magazine, Dec. 1986/Jan. 1987, p. 44 (Ad).

Primary Examiner—Robert Peshock
Assistant Examiner—Michael Lynch
Attorney, Agent, or Firm—John A. Beehner

[57] ABSTRACT

A grocery shopper organizer includes a generally flat board adapted to support coupons for groceries and the like on the top surface of the board as well as other convenience accessories such as a shopping list, calculator, pen, etc. The organizer is conveniently mounted on the upper edge of any upright wall of a shopping cart by means of an open-bottom channel strip situated on the bottom surface of the board adjacent the front edge thereof. Accordingly, the board acts as a counterweight to pivot downwardly to a convenient inclination for the shopper.

20 Claims, 3 Drawing Sheets

GROCERY SHOPPER ORGANIZER

BACKGROUND OF THE INVENTION

The present invention is directed generally to a board adapted for attachment to a shopping cart for collecting, organizing and storing coupons as well as for providing accessory conveniences such as a shopping list pad, calculator and pen.

Prior patents have shown convenience trays attachable to a shopping cart but all such trays have certain limitations which are believed to be overcome by the improved grocery shopper organizer of the present invention. Some of the prior devices are permanently attached to a shopping cart and therefore available to the customer only while shopping in a particular store. Customers who are left to their own devices for collecting and storing coupons between shopping trips often simply stick them in a drawer or purse in haphazard fashion. The coupons remain unorganized and difficult to review or retrieve.

Another shortcoming of previously disclosed devices is that they are custom fit for attachment to a particular type of cart and are therefore ill suited for use with other types of shopping carts. A related problem is that even the convenience trays which are detachably connected to a shopping cart are generally designed for attachment only to the push handle of the shopping cart. The impracticality of placing such things as a shopping list, coupons, calculator and pen right in front of an infant seated in the infant seat of a shopping cart is readily apparent.

A primary object of the invention therefore is to provide an improved grocery shopper organizer.

Another object is to provide such an organizer adapted for detachable connection to a shopping cart so as to be available for use at home to store and organize coupons between shopping trips.

Another object is to provide such an organizer which is adapted for connection to various types and styles of shopping carts.

Another object is to provide such an organizer which can be mounted at any of various positions on a shopping cart so as to be readily accessible to the shopper but out of reach of an infant and not interfering with the products placed in the cart.

Another object is to provide such an organizer with means for temporarily supporting a separate calculator so that the calculator will remain available for other uses.

Another object is to provide such an organizer which is adapted for support on a shopping cart at a convenient and comfortable inclination for the shopper.

Finally, it is an object of the invention to provide a grocery shopper organizer which is simple and rugged in construction, economical to manufacture and efficient in operation.

SUMMARY OF THE INVENTION

The grocery shopper organizer of the present invention includes a generally flat board or frame having a grooved transverse channel or channels on the back side for receiving any top edge of a shopping cart to support the board on the cart. The channel is defined by front and rear depending flanges so as to be open bottomed for easy placement onto the upper edge of a shopping cart wall. The mounting channel is secured to the bottom surface at a position offset from the center of the board toward the front edge of the board and also forwardly from the center of gravity of the organizer so that the board acts as a counterweight. As the rear edge pivots downwardly about the top edge of the shopping cart wall, the rear flange of the channel strip engages the shopping cart wall to limit downward pivotal movement of the board to a comfortable and convenient inclination facing the shopper.

Various fasteners are arranged on the top surface of the board for mounting such accessories as a shopping pad, calculator, pen and the like. A preferred coupon storage device for the top surface of the board includes one or more elastic bands stretched across the top surface of the board with the opposite ends thereof secured at designated positions for receiving and storing coupons between the bands and board. Co-acting patches of a Velcro-like material are provided for attachment to the board and to the backside of a calculator for detachably mounting a conventional calculator on the board.

The grocery shopper organizer of the invention is useful at home for selecting and storing coupons as well as organizing them in a manner so that they will be used and not forgotten. This will eliminate the clutter of coupons in drawers, purses and pockets as well as the problems associated with that practice. The pad on the organizer affords a convenient means for recording needed groceries and the like so that the list is readily available at shopping time. In a store, the grocery shopper organizer of the invention can be easily supported on the upper edge of any upstanding wall of various types of shopping carts. The organizer may be placed on the top edge of the child seat panel for most convenient access by the shopper or it may be moved to the front or side walls of the cart to avoid interference with products in the cart and to be out of reach of an infant placed in the child seat. At the checkout counter those coupons which are being used are readily accessible with the remaining coupons being retained and displayed for future use.

DESCRIPTION OF THE PREFERRED EMBODIMENT

Figure 1:
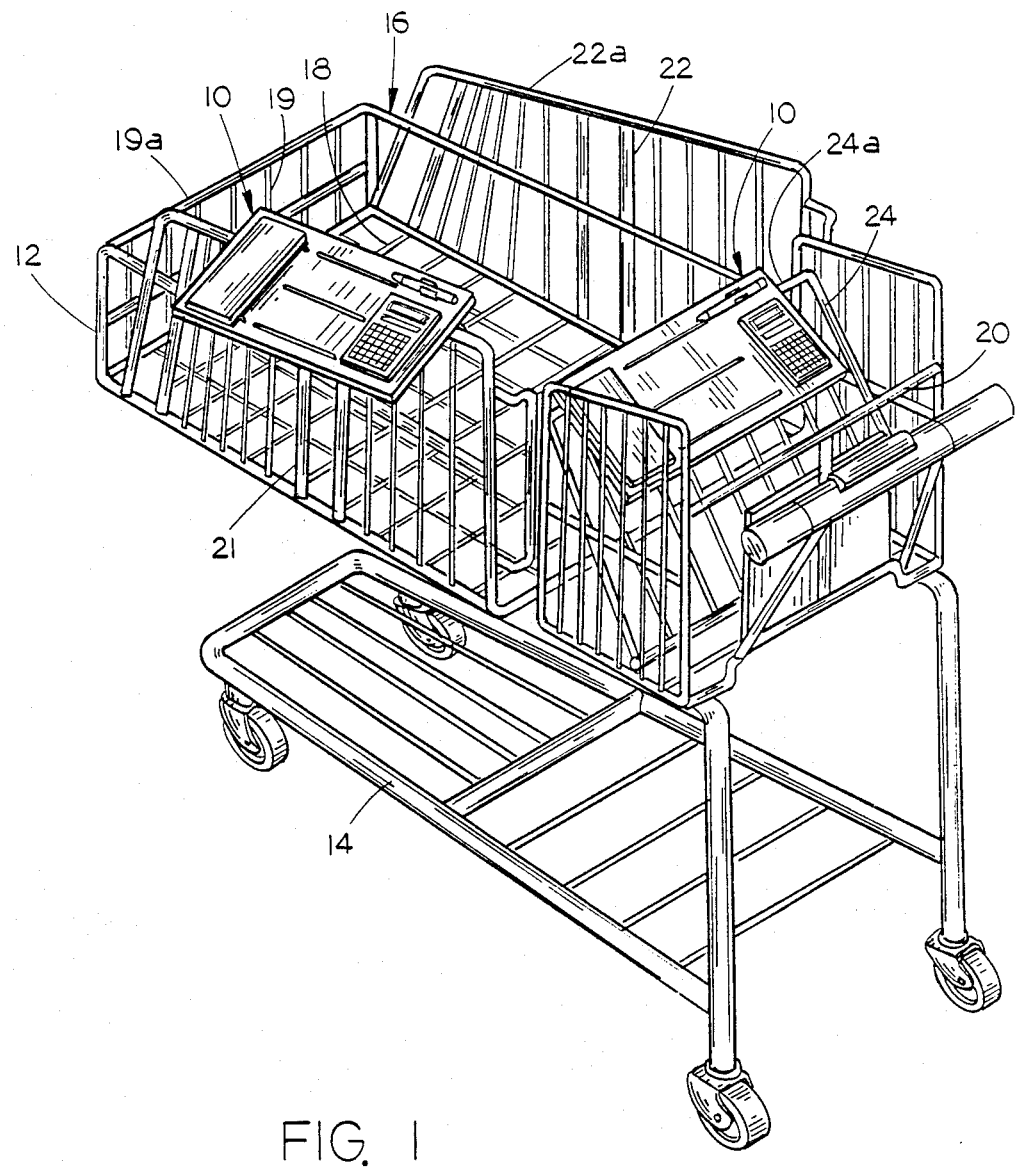
FIG. 1 is a perspective view of a shopping cart showing two grocery shopper organizers supported in alternate positions thereon.

The grocery shopper organizer 10 of the present invention is illustrated in FIG. 1 mounted in alternate positions on a shopping cart 12. Cart 12 includes the usual wheeled frame 14 and an open-topped basket 16 including a bottom wall 17 and a generally upright front wall 19, and a rear wall 20, and opposite side walls 21 and 22. Additionally, a pivotally movable child seat support wall 24 is provided to accommodate placement of an infant at the rear of the basket 16. Each of the basket walls has an upper edge, referred to by the same numeral for that wall but with the letter "a", i.e., 19a for the upper edge of front wall 19.

The child seat support wall 24 pivots on its lower edge between the open position of FIG. 1 and a closed position wherein it is inclined upwardly and rearwardly and resting against the upper edge 20a of rear wall 20. Each of the generally upright walls of basket 16, including the child seat support wall 24, has its upper edge defined by a generally horizontally disposed rod or wire that is part of the peripheral frame for the associated wire panel type wall. Other shopping carts may have the walls thereof formed of molded plastic and the organizer of the invention is adapted for those and other types of carts as well.

Figure 2:
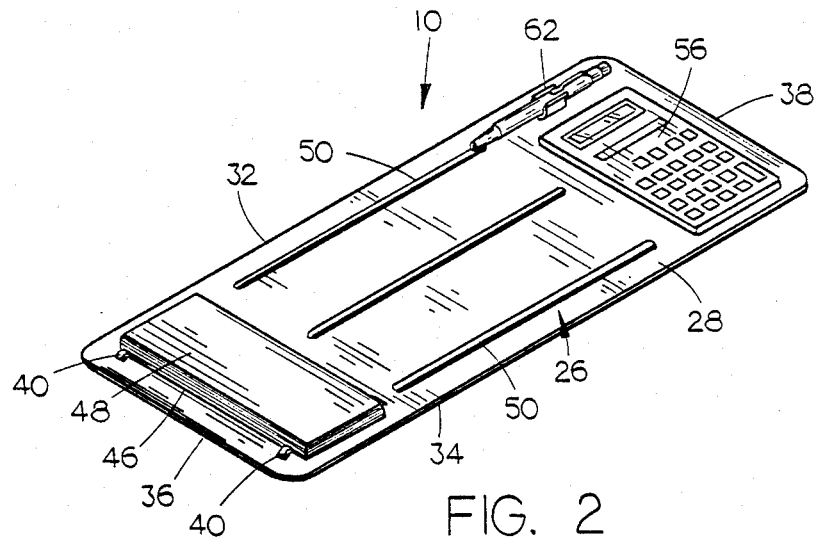
FIG. 2 is an enlarged perspective view of the invention.
Figure 3:
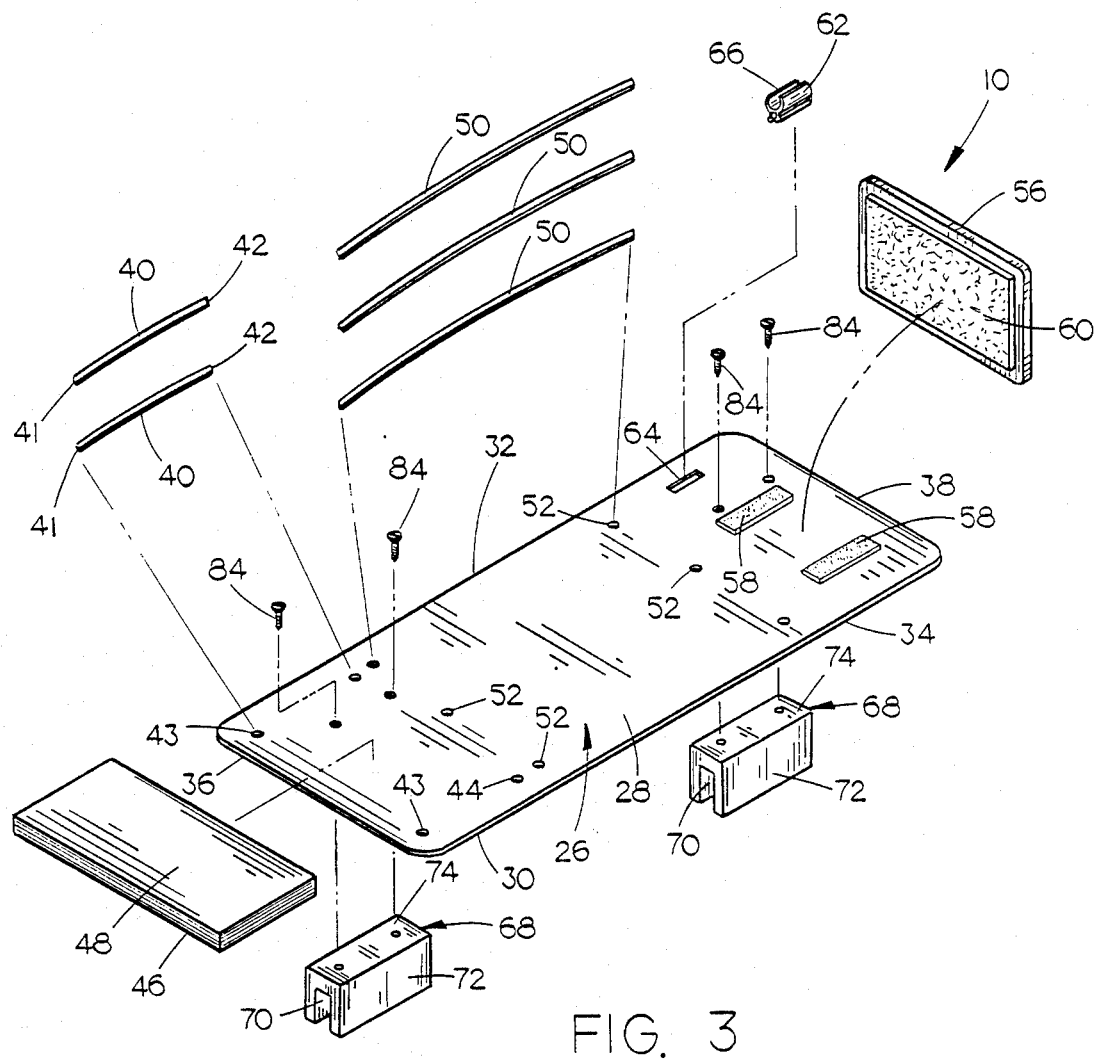
FIG. 3 is an exploded perspective view of the invention.

Referring to FIGS. 2 and 3, the grocery shopper organizer 10 includes a a generally flat board 26 having top and bottom surfaces 28 and 30, front and rear edges 32 and 34 and transversely spaced apart opposite side edges 36 and 38. The terms "front" and "rear" are used herein to designate a direction consistent with the front and rear ends of a shopping cart when the organizer is placed on the child seat support wall 24 as illustrated in FIG. 1.

Whereas flat board 26 may be in the form of a wood board, masonite or the like, the term "board" is broadly used to encompass any generally flat rigid structure such as a plastic plate or steel grid work.

Board 26 has several fastening devices thereon for mounting various accessories on the board. For example, a first pair of elastic bands 40 have opposite ends 41 and 42 inserted through respective holes 43 and 44 and formed into a knot larger than the hole and below the board 26 to prevent release of the opposite ends of the band through the holes. The bands 40 are transversely extended and spaced apart for receiving the cardboard backing 46 of a notepad 48 for shopping lists. Three similar but longer elastic bands 50 are likewise stretched transversely across a larger central portion of the board 26, with their ends similarly secured through holes 52 and tied into knots 54 for securing coupons on top surface 28 between the bands 50 and board 26.

A conventional hand-held battery powered calculator 56 is adapted to be detachably supported on top surface 28 of board 26. A preferred securement device includes the pair of transverse strips 58 of a Velcro-like material which are adhered or otherwise secured to top surface 28 as illustrated in FIG. 3. There is provided with the organizer 10 another adhesive backed patch 60 of a Velcro-like material which may be secured to the underside of any conventional calculator for detachably securing it to strips 58 on top surface 28. The Velcro-like strips enable the shopper to keep his or her calculator on the organizer 10 but leaves the calculator freely removable for use apart from the organizer.

Finally, a pen clip 62 is adapted to be snap fit into a transverse opening 64 adjacent the top edge of board 26. The pen clip 62 is of conventional construction and includes an open topped flexible channel 66 into which a pen or pencil can be snap fit and removed.

Various other fasteners for other accessories may be included on the board in accordance with the users preference. One or more of the bands 50 may be replaced with envelopes for containing small items which are otherwise difficult to handle. The above description of the accessories is not intended to be all inclusive or limiting but rather simply exemplary of those types of accessories which are believed to have widespread appeal for such an organizer.

Figure 4:
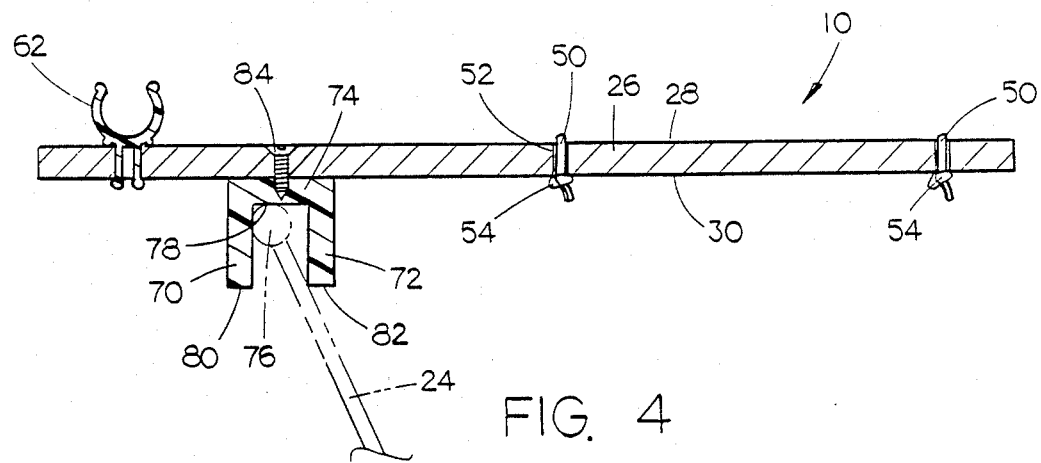
FIG. 4 is an enlarged side sectional view taken along line 4—4 in FIG. 2.

To mount the organizer 10 on a shopping cart 12, a pair of transversely extended open bottomed channel strips 68 are secured to the bottom surface 30 of board 26 at a front to back position that is offset forwardly from the center of the board toward the front edge 32 thereof, as illustrated in FIG. 4. The strips are thus situated forwardly of the center of gravity of the organizer 10 so that the board acts as a counterweight to pivot downwardly to a convenient inclination facing the shopper.

The channel strips 68 are transversely aligned with one another and arranged in spaced apart relation as illustrated in FIG. 3. In the alternative, one long strip may be provided or three or more short strips although two are preferred.

In this regard, channel strip 68 includes a pair of front and rear depending flanges 70 and 72 depending downwardly from board 26 and connected together at their upper ends by a top wall 74. The front and rear flanges 70 and 72 are spaced sufficiently apart for receiving the upper edge of a shopping cart wall 19-22. Accordingly, the spacing between front and rear flanges 70 and 72 is greater than the diameter of the top wire 76 (FIG. 4) which forms the upper edge 24a of a child seat support wall 24 in the for of a wire panel. The preferred spacing between flanges is less than twice the diameter of the top wire 76 however.

The height of front flange 70 measured from the surface 78 which engages upper edge 24a down to the bottom edge 80 of the front flange is not critical to the invention. It is simply important that the front flange be long enough to engage the inserted wall as shown in FIG. 4. The height of rear flange 72 as measured in a similar fashion, is important to the invention to the extent that it determines the angle at which the organizer rests on any given wall of the cart. Referring again to FIG. 4, it is seen that the organizer tends to pivot about the upper edge 24a of the inserted wall 24 with the result that the rear edge 34 pivots downwardly to the extent of engagement of the bottom edge of rear flange 72 with wall 24, as illustrated in FIG. 4. It is preferred that the organizer be supported with the board inclined rearwardly and downwardly at approximately a 5° to 30° angle as illustrated in FIG. 5.

In the illustrated embodiment, each channel strip 68 is secured to the board 26 by a pair of self-threading screws 84 which are screwed through board 26 from the top down for penetration into channel strips 68 for securing them in place. The tops of the screws are situated so as to be hidden by the shopping list pad 48 and calculator 56.

Figure 5:
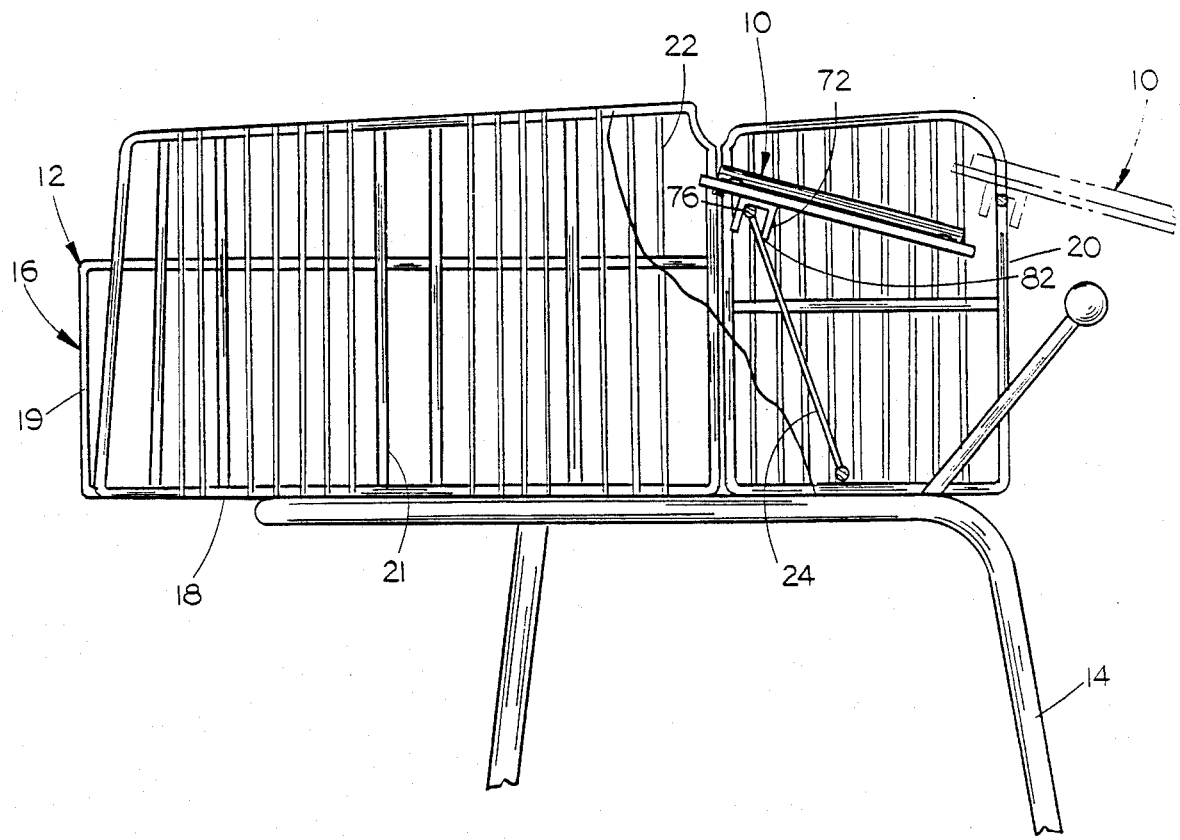
FIG. 5 is a partial side view of the organizer supported on the child's seat panel of a shopping cart, with portions broken away for clarity.

Whereas a preferred position of the organizer for the convenience of the shopper is on the child seat support wall 24 as illustrated in FIG. 5, it is apparent that the organizer can alternately be placed on the top edge of side wall 21 or on front wall 19, rear wall 20 or the other side wall 22. These positions may be preferred in a given instance to avoid interference with a large product placed in the shopping cart or to place the organizer 10 out of reach of an infant seated at the rear portion of the basket 16.

Thus, there has been shown and described a grocery shopper organizer which accomplishes at least all of the stated objects.

We claim:

1. A grocery shopper organizer adapted for support on the upper edge of any generally upright wall of a shopping cart, said organizer comprising, a generally flat board having top and bottom surfaces and front and rear edges and transversely spaced apart opposite side edges, means for detachably supporting a plurality of coupons on the top surface of said board mounting means comprising at least one transversely extended open bottomed channel strip secured to the bottom of said board at a position offset toward the front edge thereof, said channel strip including a pair of front and rear depending flanges spaced sufficiently apart for receiving the upper edge of any generally upright wall of a shopping cart therebetween, said front flange being inclined relative to said bottom surface so as to partially define a transversely extended corner adapted for positive seating of the upper edge of said shopping cart wall at its limit position of upward travel in engagement with said front flange, and said rear flange having a lower edge which is operative to engage the shopping cart wall to limit downward pivotal movement of the rear edge of said board about the upper edge of said shopping cart wall.

2. The grocery shopper organizer of claim 1 wherein said channel strip is secured to said board at a position forwardly of the center of gravity of said board.

3. The grocery shopper organizer of claim 2 wherein said channel strip further includes a top wall connected to and extending between said front and rear depending flanges.

4. The grocery shopper organizer of claim 2 wherein said mounting means further comprises a second transversely extended channel strip secured to the bottom surface of said board at a position spaced from said aforementioned channel strip and transversely aligned therewith.

5. The grocery shopper organizer of claim 1 wherein said means for detachably supporting a plurality of coupons comprises a plurality of elastic strips having opposite ends and means for fastening said opposite ends of the elastic strips to said board whereby said strips are operative to retain the coupons placed between said strips and board.

6. The grocery shopper organizer of claim 5 wherein said means for fastening said opposite ends of the strips to the board includes a pair of spaced apart holes through said board, the opposite ends of an elastic strip being inserted through said holes from top to bottom and formed into a knot larger than said hole and below said board to prevent release of the opposite ends of said strip from said holes.

7. The grocery shopper organizer of claim 1 further comprising means for detachably supporting a calculator on the top surface of said board.

8. The grocer shopper organizer of claim 7 wherein said means for detachably supporting a calculator comprises at least one strip of Velcro-like material secured to said top surface and an adhesive-backed Velcro-like strip adapted to be adhered to the calculator.

9. The grocery shopper organizer of claim 8 further comprising a pen clip mounted on said board for removably supporting a pen thereon.

10. In combination, a shopping cart including a wheeled frame and an open-topped basket on said frame, said basket including a bottom wall and generally upright front, rear and opposite side walls and a pivotally movable child seat support wall forwardly of said rear wall, each of said walls having an upper edge, and a grocery shopper organizer adapted for support on the upper edge of one of said walls, comprising, a generally flat board having top and bottom surfaces, front and rear edges and transversely spaced apart opposite side edges, means for detachably supporting a plurality of coupons on the top surface of said board, mounting means comprising at least one transversely extended open bottomed channel strip secured to the bottom surface of said board at a position offset toward the front edge thereof, said channel strip including a pair of front and rear depending flanges spaced sufficiently apart for receiving the upper edge of one of the shopping cart walls therebetween, said front flange being inclined relative to said bottom surface so as to partially define a transversely extended corner adapted for positive seating of the upper edge of said shopping cart wall at its limit position of upward travel in engagement with said front flange, and said rear flange having a lower edge in engagement with the shopping cart wall received between said flanges to limit downward pivotal movement of the rear edge of said board about the upper edge of said shopping cart wall.

11. The combination of claim 10 wherein said transversely extended channel strip is secured to said board at a position forwardly from the center of gravity of said board.

12. The combination of claim 10 wherein said walls of the shopping cart basket are formed as wire panels, each panel including a generally horizontal top wire along the upper edge thereof.

13. The combination of claim 12 wherein the spacing between front and rear flanges of said channel strip is greater than the diameter of the top wire of the wall on which said channel is placed and less than twice the diameter of said top wire.

14. The combination of claim 12 wherein the height of the front and rear flanges of the channel strip exceeds the spacing between said flanges.

15. The combination of claim 14 wherein the relative height of said rear flange of said channel strip is such that, upon placement of a channel strip onto the top wire of one of the basket walls, the lower edge of said rear flange engages said wall to support said board at a rearward and downward inclination on said wall.

16. The combination of claim 10 wherein said mounting means further comprises a second transversely extended channel strip secured to the bottom surface of said board at a position spaced from said aforementioned channel strip and transversely aligned therewith.

17. The combination of claim 10 wherein said means for detachably supporting a plurality of coupons comprises a plurality of elastic strips having opposite ends and means for fastening said opposite ends of the elastic strips to said board whereby said strips are operative to retain the coupons placed between said strips and board.

18. The combination of claim 17 wherein said means for fastening said opposite ends of the strips to the board includes a pair of spaced apart holes through said board, the opposite ends of an elastic strip being inserted through said holes from top to bottom and formed into a knot larger than said hole and below said board to prevent release of the opposite ends of said strip from said holes.

19. The combination of claim 10 further comprising means for detachably supporting a calculator on the top surface of said board.

20. The combination of claim 19 wherein said means for detachably supporting a calculator comprises at least one strip of Velcro-like material secured to said top surface and an adhesive-backed Velco-like strip adapted to be adhered to the calculator.

* * * * *